United States Patent
Mizrahi et al.

(10) Patent No.: US 9,847,925 B2
(45) Date of Patent: Dec. 19, 2017

(54) ACCURATE MEASUREMENT OF DISTRIBUTED COUNTERS

(71) Applicant: MARVELL WORLD TRADE LTD., St. Michael (BB)

(72) Inventors: Tal Mizrahi, Haifa (IL); Zvi Leib Shmilovici, Tel Aviv (IL); Gideon Navon, Tel Aviv (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 113 days.

(21) Appl. No.: 14/588,649

(22) Filed: Jan. 2, 2015

(65) Prior Publication Data

US 2015/0188798 A1    Jul. 2, 2015

Related U.S. Application Data

(60) Provisional application No. 61/922,990, filed on Jan. 2, 2014.

(51) Int. Cl.
*H04L 12/26* (2006.01)
*H04L 12/721* (2013.01)
*H04L 12/709* (2013.01)

(52) U.S. Cl.
CPC .......... *H04L 43/10* (2013.01); *H04L 43/0829* (2013.01); *H04L 43/0876* (2013.01); *H04L 45/245* (2013.01); *H04L 45/44* (2013.01)

(58) Field of Classification Search
CPC . H04L 43/0829; H04L 43/0876; H04L 43/10; H04L 45/245; H04L 45/44
USPC .................................................. 370/252, 253
See application file for complete search history.

(56) References Cited

U.S. PATENT DOCUMENTS

| | | | | |
|---|---|---|---|---|
| 5,793,976 | A * | 8/1998 | Chen ................... | H04L 12/2697 370/252 |
| 2001/0021176 | A1* | 9/2001 | Mimura ................ | H04L 1/0026 370/235 |
| 2005/0094572 | A1 | 5/2005 | Mimura et al. | |
| 2010/0165849 | A1 | 7/2010 | Eisenberg et al. | |
| 2013/0083808 | A1* | 4/2013 | Sridhar ................. | H04L 65/605 370/475 |

OTHER PUBLICATIONS

International Search Report and Written Opinion dated Mar. 18, 2015 in PCT/IB2015/050031.

* cited by examiner

*Primary Examiner* — Mang Yeung

(57) ABSTRACT

Aspects of the disclosure provide a method for collecting distributed counter values in a packet-switched system having multiple distributed packet processors. The method includes receiving a probe packet at a packet processor, storing a counter value corresponding to a flow processed by the packet processor for subsequent delivery to a management controller, and forwarding the probe packet to a next packet processor. The next packet processor stores a counter value of the next packet processor for subsequent delivery to the management controller.

17 Claims, 4 Drawing Sheets

ACCURATE MEASUREMENT OF DISTRIBUTED COUNTERS

INCORPORATION BY REFERENCE

This present disclosure claims the benefit of U.S. Provisional Application No. 61/922,990, "Accurate measurement of distributed counters" filed on Jan. 2, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

There are numerous types of counters in distributed devices in a packet-switched system, such as a chassis-based switch or router. Obtaining accurate counter values from those distributed counters is helpful for monitoring operation. For example, frame loss measurement is a mechanism defined by some computer network operation and management standards, such as the standard ITU-T Y.1731, OAM Functions and Mechanisms for Ethernet-based Networks, where OAM stands for Operation, Administration and Maintenance. The scheme computes the frame loss rate of a link between two nodes in a computer network by counting the number of packets transmitted and received over intervals using transmission and reception counters in the nodes. When several links are grouped together as a link aggregation group (LAG) to form a logical link over different packet processors, or in situations where multi-path routing protocols are deployed, obtaining accurate counter values of transmitted and received packets for the logical link is challenging

SUMMARY

Aspects of the disclosure provide a method for collecting distributed counter values in a packet-switched system having multiple distributed packet processors. The method includes receiving a probe packet at a packet processor, storing a counter value corresponding to a flow processed by the packet processor for subsequent delivery to a management controller, and forwarding the probe packet to a next packet processor. The next packet processor stores a counter value of the next packet processor for subsequent delivery to the management controller. The method further includes receiving the probe packet at the management controller and collecting the counter values of the multiple distributed packet processors of the packet-switched system to determine a global counter value for the packet-switched system. The method further more includes determining a forwarding path including packet processors selected by the management controller and generating the probe packet at the management controller.

In an embodiment, a performance parameter related to the packet-switched system is calculated based on the global counter value.

In an embodiment, the packet processor stores the counter value by saving the counter value into separate fields of the probe packet. In another embodiment, the packet processor stores the counter value by aggregating the counter value into a field of the probe packet. In a further embodiment, the packet processor writes the counter value to a memory within each respective distributed packet processor and transmits the counter value of the memory to the management controller in response to a request from the management controller.

According to an aspect of the disclosure, the probe packet includes a first field that identifies the packet as a probe packet and a second field for storing the counter values of the distributed packet processors in the system. In an embodiment, the counter counts the number of packets of a flow received and transmitted by the selected packet processor to obtain the counter value. In another embodiment, the counter counts the number of bytes of a flow received and transmitted by the selected packet processor to obtain the counter value.

Aspects of the disclosure provide a chassis switch. The switch includes multiple distributed packet processors that each includes a counter that maintains a counter value corresponding to a flow processed by the packet processor. The switch further includes a management controller that transmits a probe packet to the multiple distributed packet processors of the switch. The probe packet is received by a first packet processor and subsequently forwarded to a next packet processor and each of the multiple distributed packet processors that receives the probe packet stores the counter value in response to receiving the probe packet.

According to an aspect of the disclosure, the management controller is further configured to receive the probe packet and collect the counter values of the multiple distributed packet processors of the chassis switch to determine a global counter value for the chassis switch.

According to an aspect of the disclosure, the management controller is further configured to determine a forwarding path including the selected distributed packet processors and generate the probe packet.

Furthermore, the management controller is configured to calculate a performance parameter related to the chassis switch based on the global counter value.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
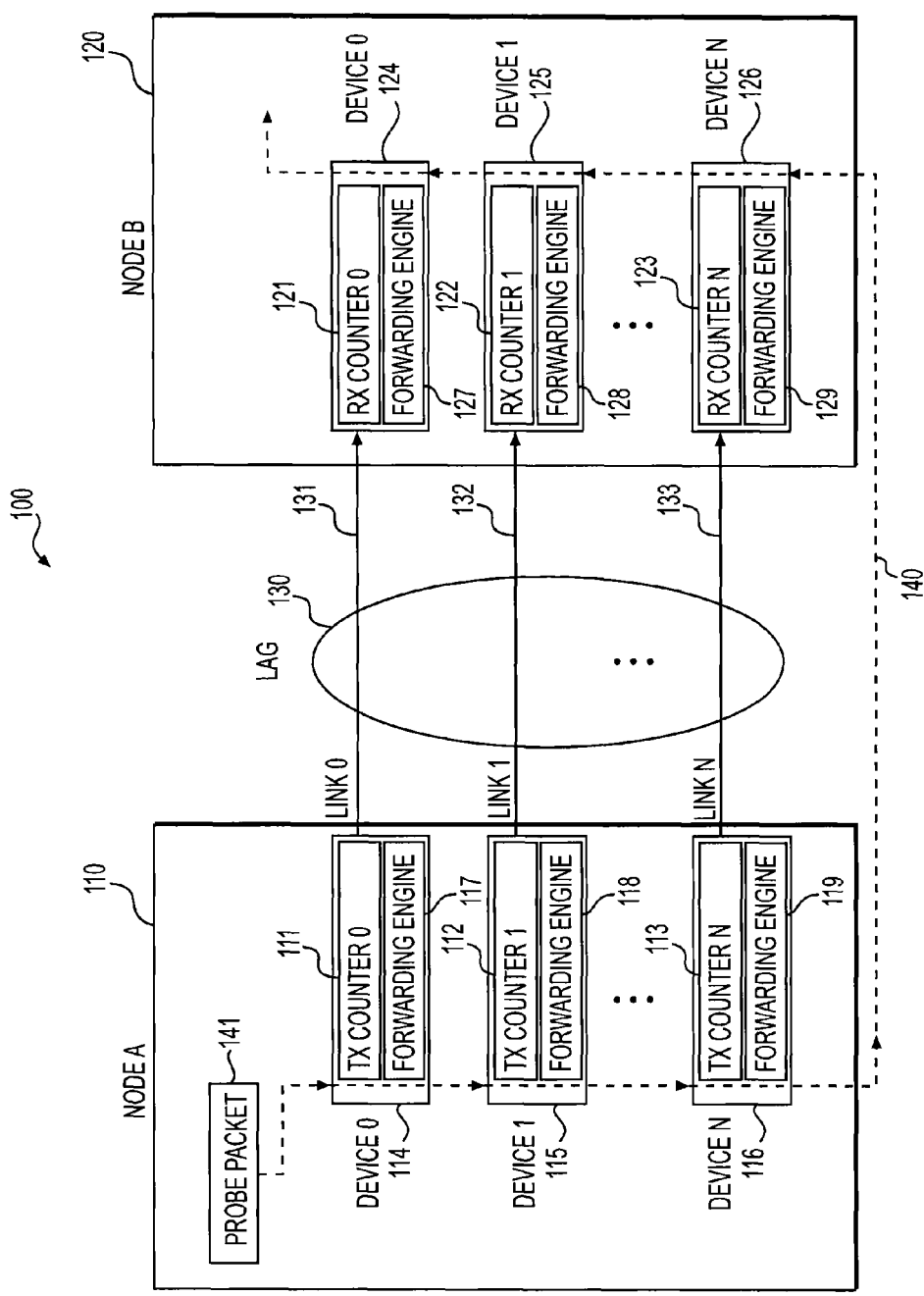
FIG. 1 shows a diagram illustrating a computer network 100 according to an embodiment of the disclosure.

FIG. 1 shows a diagram illustrating a computer network 100 according to an embodiment of the disclosure. In FIG. 1, the node A 110 and node B 120 are packet-switched systems that forward packets according to destination addresses and other information carried in the packets. In an example, the packet-switched systems are chassis-based switches or routers including multiple distributed line cards or switch modules installed in the chassis, and each line card or switch module includes multiple distributed devices, such as devices 114-116 and 124-126 shown in FIG. 1. In an example, multiple distributed devices exist separately in one switch module. In another example, multiple distributed devices are distributed in multiple switch modules. In one embodiment, the distributed devices are packet processors. In various embodiments, the packet processors are implemented with general-purpose processors, application-specific integrated circuits (ASIC), field-programmable gate arrays (FPGA) or any other suitable types of hardware and software. In addition, the packet processors each include one or more forwarding engines to carry out packets forwarding functions. For example, in FIG. 1, the distributed devices 114-116 and 124-126 each have forwarding engines 117-119 and 127-129, respectively.

In FIG. 1, each distributed devices of the node A and node B include different types of counters for different usages. For example, depending on the type of counter that is used, the counter will count a number of packets or bytes of a specific packet flow passing through a distributed device, while another type of counter is used to count a number of packets or bytes of all packets received or transmitted at a distributed device. In addition, there can be different counters counting different events handled in the distributed devices. Each counter maintains a counter value corresponding to the number of packets or bytes of a flow or the number of events handled in the distributed devices. In packet-switched systems and networks, packet flow or traffic flow is defined as a sequence of packets sharing the same characteristic. For example, a packet flow can be defined according to the source addresses and destination addresses of the packets, and packets having the same source IP address and destination IP address belongs to the same packet flow. In another example, packet flows are defined according to the levels of quality of service (QoS) associated with the packets, and packets associated with a certain QoS level have a field in their headers indicative of the respective QoS level they require. Generally, packets of different flows are treated and processed differently in packet-switched systems.

According to an aspect of the disclosure, a probe packet is used to collect counter values from distributed devices in an embodiment. The probe packet is generated and forwarded through all or a selected subset of distributed devices in a packet-switched system using existing forwarding mechanism of the forwarding engines included in the distributed devices. Triggered by the probe packet, the distributed devices incorporate the counter values of a specific type of counters into the probe packet or save the counter values of a specific type of counters into a local memory for later delivery. The method of using a probe packet to collect counter values from distributed devices is described in further detail below.

In FIG. 1, the node A 110 includes multiple distributed devices 114-116 and each device includes a transmission (Tx) counter 111-113 and a forwarding engine 117-119 respectively. Similarly, the node B 120 includes multiple distributed devices 124-126 and each device includes a reception (Rx) counter 121-123 and a forwarding engine 127-129 respectively. Of course it should be understood that various embodiments include any number of distributed devices in either node A or node B. Also, alternative embodiments of distributed devices include both transmission and reception counters. Node A and node B are connected by multiple links 131-133. The link 131 starts from the device 114 and terminates at the device 124. The Tx counter 111 counts packets or bytes transmitted into the link 131 and the Rx counter 121 counts packets or bytes received from the link 131. Similarly, the link 132 connects the device 115 with the device 125, and the Tx counter 112 and the Rx counter 122 count the packets or bytes transmitted and received via the link 132 respectively; the link 133 connects the device 116 with the device 126, and the Tx counter 113 and the Rx counter 123 count the packets or bytes transmitted and received via the link 133 respectively. The terms "packet" and "frame" are usually used with layer 3 Internet Protocol (IP) networks and layer 2 Ethernet networks respectively in the field of networking, but they are used interchangeably for ease of explanation in the context described in this detailed description. As shown, the links 131-133 are combined to form a LAG 130, and consequently the distributed devices 114-116 and 124-126 are associated with the LAG 130. Similarly, the counters 111-113 and 121-123 are also associated with the LAG 130.

For ease of explanation, in the FIG. 1 example, the links 131-133 are depicted as unidirectional links and only one link is coupled with each device in this example embodiment. However, in other embodiments, the links 131-133 are duplex bidirectional, and there are multiple links coupled with each device 114-116 and 124-126.

The links are of various physical types. For example, the media of the links can be unshielded twisted pair, and single-mode or multimode fiber and the protocols can be Ethernet, SONET (synchronous optical network) and SDH (synchronous digital hierarchy). The LAG 130 can be configured with various schemes, for example, it can be a LAG defined by the standard Link Aggregation Control Protocol (LACP), a switch module based LAG that combines links associated with different switch modules in modular switches or routers, or a chassis based LAG that combines links associated with different switch or router chassis.

In an embodiment, in order to conduct performance monitoring of the computer network 100, a frame loss rate parameter for the LAG 130 as a logical link is calculated. A frame loss rate of a link is generally defined as the ratio of the number of frames lost to the number of frames transmitted through the link. Counters are used at both nodes coupled with the link to count the packets transmitted and received, and the counter values are delivered between the nodes by periodically transmitting frame loss measurement packets. The number of the lost frames is obtained by comparing the difference between the number of frames transmitted and the number of frames received via the link.

The LAG 130 as a logical link has multiple Tx counters 111-113 and multiple Rx counters 121-123 associated with the LAG 130, in an embodiment. For example, the Tx counter 111 and Rx counter 121 are associated with the link 131 and count packets transmitted and received via the link 131 respectively, while the Tx counter 112 and Rx counter 122 are associated with the link 132 and count packets transmitted and received via the link 132 respectively. Similarly, the Tx counter 113 and Rx counter 123 associates with the link 133. In addition, the counters are distributed on multiple distributed devices 114-116 and 124-126 in the node A and node B respectively. In order to calculate the frame loss rate of the LAG 130, a first total value of the multiple distributed Tx counters and a second total value of the multiple distributed Rx counters need to be obtained. The first total value is the sum of the counter values of the distributed Tx counters 111-113 captured at the moment the frame loss measurement packet transmitted from the node A. Similarly, the second total value is the sum of the counter values of the distributed Rx counters 121-123 captured at the moment the frame loss measurement packet arrived at the node B.

As shown in FIG. 1, in order to accurately record the values of the distributed counters 111-113 and 121-123 in an embodiment, a probe packet 141 is used. In this embodiment, the probe packet 141 performs the function of a frame loss measurement packet delivering collected counter values from node A to node B. Before the packet 141 is generated, a subset of distributed devices in the node A and node B are selected and an order of passing through the selected distributed devices is determined to create a forwarding path for the probe packet. In addition, the type of counters to be probed is also determined. Information about the forwarding path and the type of the counters to be probed is incorporated into the probe packet when the probe packet is generated. For example, in order to calculate the frame loss rate of the LAG 130, the distributed device 114-116 and 124-126 are selected to be included in the forwarding path because they are associated with the LAG 130, and Tx counters 111-113 and Rx counters 121-123 are determined to be probed because they are counting packets transmitted via the LAG 130. Next, the probe packet 141 is sent along a route 140 that passes through all selected devices 114-116 and 124-126. Along the route 140, the probe packet 141 causes the selected devices to store the transmission and reception counter values of the respective distributed devices either by incorporating the counter values into the packet, or by writing the counter values into a local register or other type of memory in the respective devices for a later collection.

Specifically, at the side of node A, the probe packet 141 sequentially goes through distributed devices 114-116. As the probe packet 141 arrives at a distributed device, for example, the device 114, the counter value of the respective Tx counter 111 is incorporated in the probe packet 141 by the device 114 in response to receiving the probe packet 141, and then the packet is forwarded by the forwarding engine 117 in the respective device 114 to the next distributed device 115. In such a way, after the probe packet 141 passes through all distributed devices 114-116 in node A, it is transmitted through the link 133 associated with the last distributed device 116 to Node B carrying the stored counter values of the distributed Tx counters 114-116.

At the side of node B, similar to the process carried out at the side of node A, the probe packet 141 is received at the device 126 and then goes through the distributed device 126-124. As the probe packet 141 passes through each device, the counter values of the respective Rx counters 123-121 are incorporated in the probe packet 141 by each device, in an embodiment, in response to receiving the probe packet 141. Alternatively, in another embodiment different from the process in node A, the Rx counter values are captured and written into a local memory of the respective distributed device temporarily for a later collection. At the end of the route 140, when the probe packet 141 leaves the device 124, all distributed counter values are already incorporated in the probe packet 141 so that they can be delivered to a destination where the values can be tabulated and, in an embodiment, used to calculate a performance parameter, such as, for example, the frame loss rate, of the logical link LAG 30. Alternatively, at the side of node B, the distributed Rx counter values that are stored in the distributed devices 124-126 can be retrieved later for the performance parameter calculation.

It is noted that during the above process, the forwarding mechanisms of node A as a switch or router operates at a line speed that is fast enough for a probe packet to capture multiple distributed counter values instantly, and as a result, consistent counter values are obtained for calculating the frame loss rate of the LAG 130.

It is further noted that the above described method is applied to LAG-irrelevant settings. For example, in a data center network in cloud computing field, there are numerous servers or switches each having one or more counters for different purposes. In this scenario, in order to collect the distributed counter values, the method of using a probe packet that is passed through each device based on a packet forwarding decision is more efficient than that of using a central entity to retrieve the counter values one by one. In another example where a multi-path protocol, such as equal-cost multi-path (ECMP) routing protocol, is deployed in a packet-switched network, packets of the same flow arrive at or depart from a packet-switched system, such as a chassis router, via different routes in the packet-switched network. In this scenario, the packets enter or leave the packet-switched system via different ports associated with different switch modules, and are processed by packet processors that are distributed at different switch modules. Thus, counters counting bytes or packets of the same flow are distributed in the packet-switched system. The method of using a probe packet to collecting distributed counter values is also applicable for this example.

Figure 2:
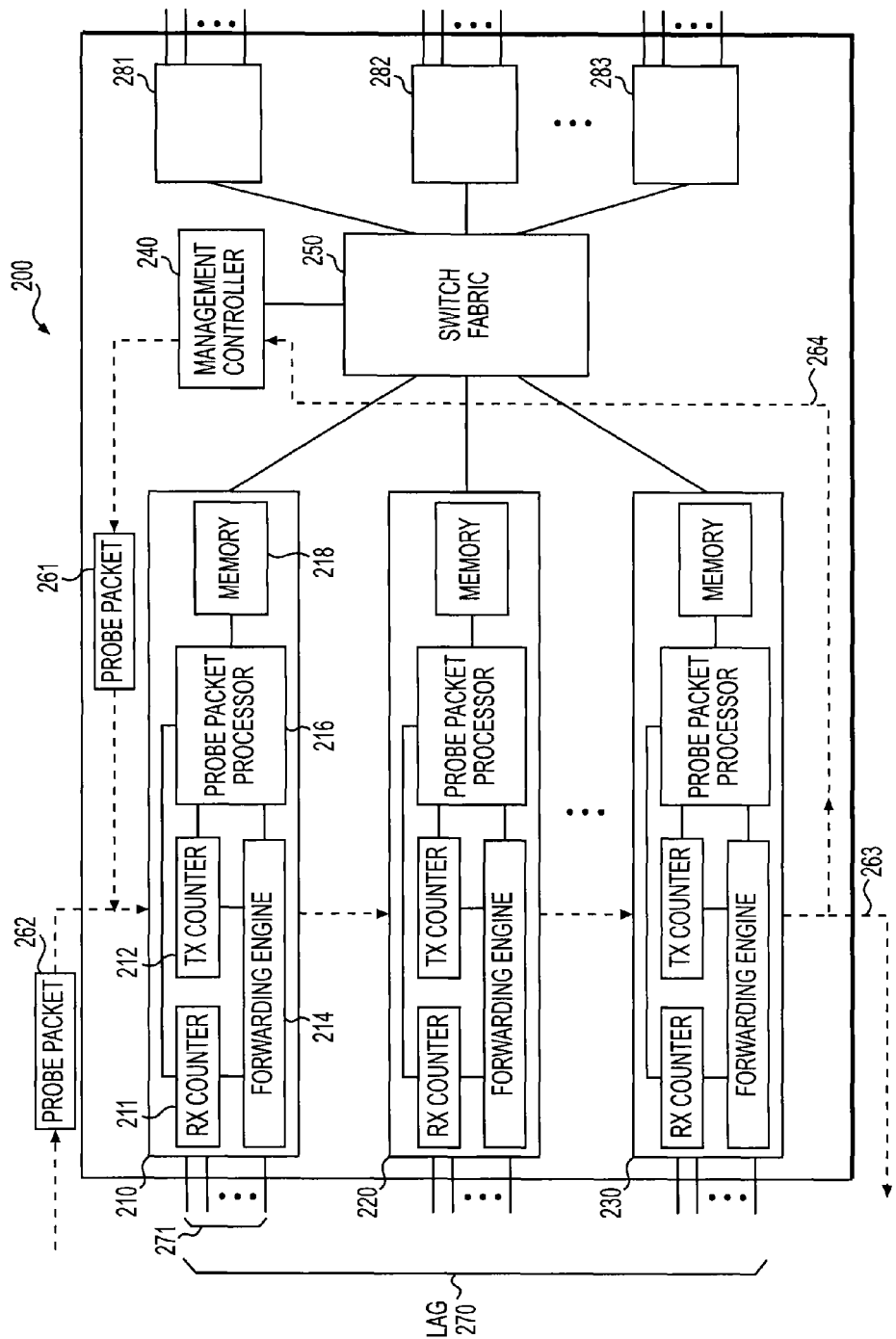
FIG. 2 shows a diagram illustrating a packet-switched system 200 according to an embodiment of the disclosure.

FIG. 2 shows a diagram illustrating a packet-switched system 200 according to an embodiment of the disclosure. The example of capturing distributed counter values of distributed devices will be described in greater detail with reference to FIG. 2. As shown, a packet-switched system 200, such as a chassis switch or router, includes a first group of multiple distributed packet processors 210-230 each including multiple counters, a second group of multiple distributed packet processors 281-283, a management controller 240, and a switch fabric 250.

In an embodiment, the first group of distributed packet processors is configured to be associated with a LAG 270. In order to calculate a frame loss parameter of the LAG 270, counter values of multiple distributed packet processors, such as packet processors 210-230, need to be collected during a performance monitoring process of LAG 270. As also shown in FIG. 2, the second group of packet processors is similar to the first group of packet processors in terms of functions and structures. However, the second group of packet processors remains separate and is therefore not associated with the LAG 270. The internal structures and operations of the second group of packet processers are similar to the first group, but are not shown in FIG. 2 for clarity of description.

In FIG. 2, the switch fabric 250 is coupled with each of the first group of packet processors 210-230 and the second group of packet processors 281-283, and it provides high speed packet transmission channels between fabric-enabled packet processors in the packet-switched system 200, in an embodiment. The switch fabric 250 is also coupled with the management controller 240 providing channels for the management controller 240 to communicate with the distributed packet processors 210-230 and 281-283. The switch fabric 250 can include multiple switch fabrics forming a network of fabrics. The switch fabrics are generally implemented in the form of switch fabric chips. In some embodiments, some of the packet processors are non-fabric-enabled. In this case, a switch bus is used to provide connections between non-fabric-enabled packet processors. In addition, the switch bus is used to provide connections between non-fabric-enabled packet processors and fabric-enabled packet processors via an interface between the switch fabric and the switch bus.

In FIG. 2, the management controller 240 generates probe packets, such as probe packet 261. Alternatively, a management controller that is part of a remote system (not shown) that is coupled with the LAG 270 generates probe packets too, such as a probe packet 262. The probe packets carry forwarding path information. In order to determine a forwarding path, the management controller 240 selects all or a subset of distributed devices and decides an order of passing through the selected distributed devices in an embodiment. For example, in the example of LAG 270 shown in FIG. 2, the distributed packet processors 210-230 in the packet-switched system 200 are selected to be probed. Similarly, the distributed packet processors coupled with the LAG 270 in the remote system are also selected. At the same time, the packet processor 210 is determined to be the first selected device to be passed through, the packet processor 220 the second selected device to be passed though, and so on. While not shown, the probe packet 261 is also able to be passed through devices 281-283 that are not associated with a LAG.

In addition, the management controller 240 receives probe packets, such as probe packet 262. The received probe packets carry the counter values of the distributed packet processors. Further, the management controller 240 retrieves the counter values that are stored in memories of each distributed packet processors 210-230 as a response to receiving a probe packet. Based on counter values either carried in the received probe packet or retrieved from the memories, the management controller 240 determines a global counter value. In the example of calculating the frame loss rate parameter, the management controller calculates a frame loss rate for the LAG 270 based on the global counter value. A global counter value can be in a form of a total value of the respective counter values or in a form of a list that includes each collected counter values. The management controller 240 generally exists in a control plane of the packet-switched system 200 and is implemented in software or hardware. For example, it is software running in a central processing unit (CPU) of the control plane, or circuits designed to perform functions of the management controller 240.

The probe packet generally has similar format of a regular packet processed in the packet-switched system 200. However, it can have certain fields that are special in order to be recognizable, as well as to perform functions, of a probe packet. For example, it has a field or an identifier in its header indicative of that it is a probe packet.

In addition, a probe packet can have one or multiple fields in its payload for incorporating the distributed counter values when it passes through a distributed packet processor. The fields can be reserved in advance when the probe packet is generated or attached at the moment when the probe packet is processed in a distributed packet processor. For example, the probe packet 262, which is transmitted from the remote system, carries in its payload counter values of distributed packet processors in the remote system that is coupled with the LAG 270.

Further, the probe packet can also have a field in its header indicative of the type of targeted counters to be probed. For example, in the LAG application in the FIG. 2 example, the counters to be processed are either transmission or reception counters, such as Rx counters or Tx counters in the distributed devices 210-230. In other examples, the targeted counters are counters counting bytes or packets of specific packet flow. Therefore, the field in the probe packet header is used to indicate the type of the targeted counters.

As mentioned above, in various embodiments, the probe packet also carries information of the forwarding path, such as which selected packet processors to be probed and in what order. For example, when the probe packet is generated by the management controller, information of packet processor addresses or identifications is loaded in a specific order to certain fields of the header of the probe packet. Alternatively, the above forwarding path information is configured into the forwarding engines instead of being carried by the probe packet. For example, the address information is distributed into the forwarding engines by the management controller using schemes similar to downloading forwarding table information into the distributed packet processors. In operation, existing forwarding mechanisms in the packet processor can be used to forward the probe packet to a next distributed device based on the forwarding path information. For example, triggered by receiving a probe packet, the forwarding engines in each of the packet processors can choose a next packet processor by using the local information or information carried in the probe packet.

In FIG. 2, the packet-switched system 200 has multiple similar distributed packet processors 210-230 associated with the LAG 270 in one embodiment. The packet processor 210 is used below as an example to illustrate the probe packet processing process in a distributed packet processor.

As shown, the packet processor 210 has multiple functional blocks including a forwarding engine 214, an Rx counter 211, a Tx counter 212, a probe packet processor 216, and a memory 218. The forwarding engine 214 is coupled with the Rx counter 211, the Tx counter 212 and the probe packet processor 216. In addition, the probe packet processor 216 is coupled with the Rx counter 211, the Tx counter 212 and the memory 218. In some embodiments, there are multiple different types of counters in addition to the Rx counter 211 and the Tx counter 212. For example, there are types of counters counting bytes or packets of a specific flow. In some embodiments, there are multiple forwarding engines in one distributed packet processor. For example, in an embodiment, there is a forwarding engine for processing packets received from the associated links 271 via ingress ports and a forwarding engine for processing packets to be transmitted to the associated links 271 via egress ports. However, only one forwarding engine is used in each packet processor 210-230 in the FIG. 2 example for ease of explanation. As shown in FIG. 2, all links connected with each packet processor are members of the LAG 270. However, there can be only a portion of these links that are configured to be members of the LAG 270 in other embodiments.

The forwarding engine 214 generally performs functions such as forwarding look up, packet modification, packet classification, and traffic management. In operation, the forwarding engine 214 receives packets from multiple links 271 via a physical device interface (not shown) capable of operating with links of various physical types. The forwarding engine 214 forwards the received packets to corresponding destination packet processors included in the second group of devices 281-283 via the switch fabric 250. The destination packet processors are determined according to the address information carried in the packets. During this forwarding process, the number of packets received from the link 271 can be counted with the Rx counter 211, or the number of packets or bytes corresponding to a specific packet flow can be counted by other types of counters. Similarly, the forwarding engine 214 receives packets from the second group of packet processors 281-283 via the switch fabric 250 and forwards the received packets to the links 271. Meanwhile, the number of packets transmitted to the link 271 can be counted with the Tx counter 212, or the number of packets or bytes transmitted corresponding to a specific packet flow can be counted by other types of counters.

In operation, a probe packet, for example the probe packet 261 or the probe packet 262, arrives at the packet processor 210. In this example, the probe packet is first processed by the forwarding engine 214. The probe packet arrives at the packet processor 210 from either inside or outside the packet-switched system 200 via different routes. For example, the probe packet 261 is generated by the management controller 240 and transmitted to the device 210 via the switch fabric 250. Subsequently, the packet processor 220 receives the probe packet from the packet processor 210 via the switch fabric 250. In another example, the probe packet 262 is received via the links 271 from a remote system coupled with the LAG 270. In either example, the forwarding engine 214 recognizes the probe packet 261 or 262 by inspecting the identifier in the packet header and then passes the probe packet 261 or 262 to the probe packet processor 216 for further processing. In other embodiments, the probe packet 261 or 262 is saved at a memory in the storage module (not shown in FIG. 2) and only related information in the packet header is passed to the probe packet processor 216.

At the probe packet processor 216, when receiving the probe packet 261 from the forwarding engine 214, the processor 216 initially examines the packet header to determine what type of counters to be processed among multiple types of counters. As a result, the value of Tx counter 212 is determined to be stored for the probe packet 261. For the case of the probe packet 262 being received, the value of the Rx counter 211 is determined to be stored. Then the probe packet processor 216 performs counter value storing operations. In an embodiment, the probe packet processor 216 writes the target counter values into the probe packet for immediate delivery, for example by saving the counter values from each device in separate fields of the probe packet or by adding the counter values to a dedicated field which is configured to contain an aggregate counter value. In another embodiment, target counter values are written to a local memory 218, for example, a register, for later delivery to the corresponding management controllers in response to receiving the probe packet. After counter values are stored, whether by suitably updating the probe packet or by writing the counter value to the register, the probe packet 261 or 262 is returned to the forwarding engine 214 for forwarding to the next packet processor 220.

In some embodiments, there can be more than one Tx counters or Rx counters in each of the distributed packet processors. In this case, during the counter value storing operations, the probe packet processor 216 first aggregates the values of the multiple Tx counters or Rx counters respectively, then incorporate the sum of the values into the probe packet 261 or write the sum of values in a local memory. Alternatively, the multiple counter values are incorporated into multiple fields in the probe packet or written into a memory without aggregation.

The probe packet processor 216 can generally be implemented in hardware and operate at line speed. For example, it can be implemented with ASIC, FPGA or other type of suitable integrated circuits. It can reside along the forwarding engine on the same chip, or it can be implemented on another separate integrated circuits.

At the forwarding engine 214, based on the forwarding path information, the forwarding engine 214 forwards the probe packet to the next device, for example, the device 220 via the switch fabric 250. For different embodiments, the forwarding path information used above is either carried in the probe packet or stored locally. When the probe packet passes through the last distributed packet processor 230 associated with the LAG 270, the probe packet is forwarded to different destinations depending on sources of the probe packet. For example, for the probe packet 261 generated locally by the management controller 240, after the counter values of the Tx counters of the distributed devices 210-230 have been incorporated into the probe packet 261, it is transmitted to the remote system of the LAG 270 along a route 263 depicted in FIG. 2 via a link coupled with the device 230. While for the probe packet 262 coming from the remote system, after the counter values of the Rx counters of the distributed packet processors 210-230 have been incorporated into the probe packet 262 or written into local memories, it is transmitted to the management controller 240 along the route 264 via the switch fabric 250. In some other embodiments, a probe packet can be generated by a management controller of a system and sent back to the same management controller after distributed counter values have been collected or stored.

It is noted that, before the probe packet 262 arrives at the packet-switched system 200, the counter values of Tx counters of the distributed packet processors in the remote system are incorporated into the probe packet 262 through a process that is similar to the process described above.

At the management controller 240, when a probe packet, for example, the probe packet 262, is received, by examining a special field in the probe packet 262, the controller 240 determines whether the counter values are incorporated in the probe packet 262 already, or some Rx counter values of processors 210-230 are stored in local memories in the packet processors waiting for being retrieved by the controller 240.

In the first scenario, counter values have been incorporated in the probe packet 262, either by saving the counter values in separate fields of the probe packet corresponding to respective devices or by aggregating the counter values in a dedicated field. Thus, the management controller 240 collects the values from the corresponding fields of the packet and obtains a total transmission counter value of the remote system and a total reception counter values of the distributed devices 210-230 in the packet-switched system 200.

In the second scenario, Rx counter values of packet processors 210-230 are stored in local memories. Thus, the management controller 240 sends requests to the distributed packet processors 210-230 to obtain the stored the counter values. The packet processors 210-230 subsequently transmits the stored counter values to the controller 240 as a response to the requests from the management controller via a communication process between the management controller 240 and the packet processors 210-230. This communication process is conducted via the switch fabric 250 or via other communication channels between the packet processors 210-230 and the controller 240, for example, an Ethernet network for control plane communications in a chassis-based router or switch. As the controller 240 receives the stored counter values from the distributed packet processors, it obtains a total value of the Rx counters of the packet processors 210-230 in the packet-switched system 200. In addition, it obtains a total value of the Tx counters in the remote system by collecting the Tx counter values carried in the probe packet 262. As a result, based on the counter values collected in the above processes, the controller 240 can calculate a packet loss rate parameter for the LAG 270.

For the probe packet 261, it is transmitted to the remote system where it passes through the distributed devices associated with the LAG 270 and arrives at a management controller similar to the controller 240. A process similar to that happened at the controller 240 takes place at the controller of the remote system.

The counter value storing operations by the probe packet processors described with reference to FIG. 2 will now be described in more detail with references to FIGS. 3A, 3B and 3C. As described below, there are several techniques to perform the storing operations.

Figure 3:
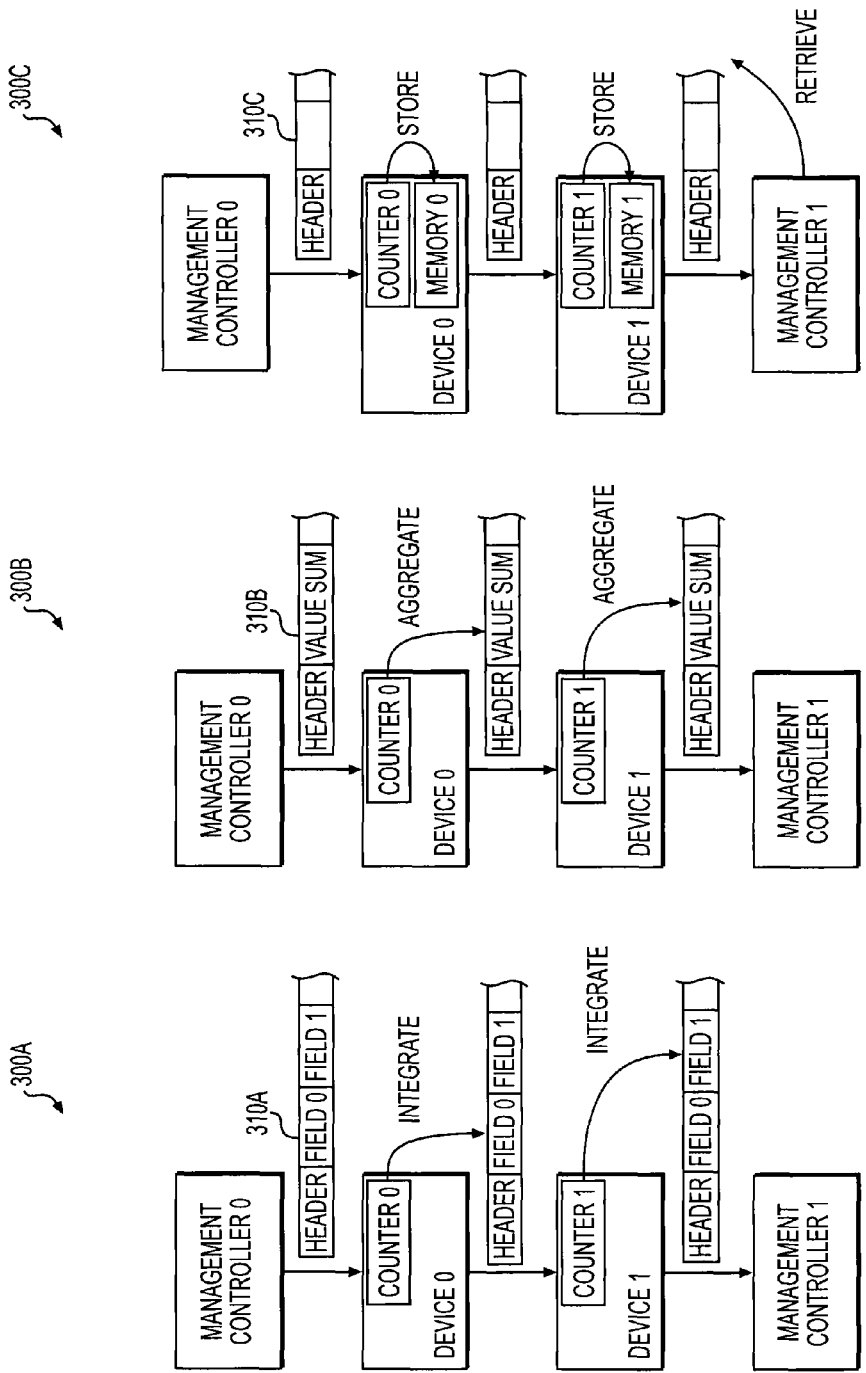
FIG. 3A shows a diagram illustrating the first option technique 300A of the counter value storing operations performed by the probe packet processor 216 in FIG. 2 according to an embodiment of the disclosure.
FIG. 3B shows a diagram illustrating the second technique 300B of the counter value storing operations according to an embodiment of the disclosure.
FIG. 3C shows a diagram illustrating the third technique 300C of the counter value storing operations according to an embodiment of the disclosure.

FIG. 3A shows a diagram illustrating the first technique 300A of the counter value storing operations performed by the probe packet processor 216 in FIG. 2 according to an embodiment of the disclosure. As shown, a management controller generates a probe packet 310 A that passes through a device 0 and a device 1 sequentially and arrives at a management controller 1. The probe packet 310A includes a header and multiple separate fields including a field 0 and a field 1. As the packet 310A passes through the device 0, a counter value of counter 0 of the device 0 is saved into the packet 310A at the separate field 0 by a probe packet processor (not shown in FIG. 3A) in the device 0. Similarly, as the probe packet 310A subsequently passes through the device 1, a counter value of counter 1 of the device 1 is saved into the packet 310A, but at the separate field 1. Next, the probe packet 310A is forwarded to the management controller 1. Thus, in the first technique, the distributed counter values are integrated into separate fields for the purpose of storing. In some embodiments, there can be multiple counters in each of the distributed devices. For this case, an alternative integration operation can be integrating each of the multiple counter values into a separate field.

FIG. 3B shows a diagram illustrating the second technique 300B of the counter value storing operations according to an embodiment of the disclosure. A probe packet 310 passes through the same devices along the same route as that shown in FIG. 3A. However, the packet 310 has a different structure. Specifically, the packet 310 includes a value sum field in addition to a header. As the packet 310B passes through the device 0, the counter value of the counter 0 is aggregated into a value sum in the value sum field by the probe packet processor (not shown) in the device 0. Next, similarly, as the packet 310B passes through the device 1, the counter value of the counter 1 is aggregated into the value sum carried by the probe packet 310B. At the end, the packet 310B arrives at the management controller 1. Thus, different from the first technique, the distributed counter values are aggregated into a dedicated field in the probe packet 310B in order to collect a total count value for the device 0 and the device 1.

FIG. 3C shows a diagram illustrating the third technique 300C of the counter value storing operations according to an embodiment of the disclosure. In technique 300C, a probe packet 300C is generated by the management controller 0, passes through the device 0 and the device 1, and arrives at the management controller 1. The devices, the management controllers and the route the probe packet 310 passes are the same as that in FIGS. 1 and 2. However, a memory 0 and a memory 1 is included in the device 0 and device 1, respectively. As the probe packet 310C passes through the device 0 and the device 1, no operation is performed on the probe packet 310C. Instead, the counter values in counter 0 and counter 1 are stored into the memory 0 and memory 1, respectively, by the respective packet processors (not shown) in the device 0 and device 1. Thus, in the third technique, the counter values are captured by storing the values into the memories. As the last phase of the process of the third technique, the management controller 1 retrieves the stored values from the memories of the distributed device 0 and device 1. For example, the management controller 1 retrieves the content of the memories by separate requests in an embodiment. Alternatively, management controller 1 retrieves the content of memories using a second probe packet (not seen) subsequent to the probe packet 310C.

It is noted that although only two distributed devices are used to illustrate the techniques of counter value storing operation in the above description with reference to FIGS. 3A, 3B and 3C, the applicability of the methods described can be readily expanded to scenarios of more than two distributed devices by repeating the operations within a single distributed device.

Figure 4:
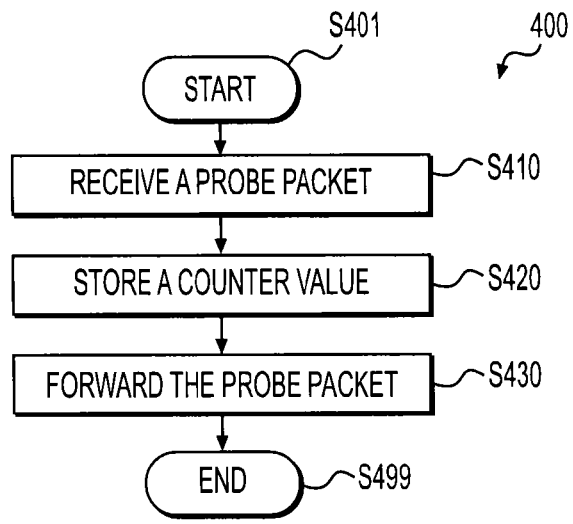
FIG. 4 shows a flowchart illustrating a process 400 of processing a probe packet at each of the distributed packet processors 210-230 in the packet switched system 200 in FIG. 2.

FIG. 4 shows a flowchart illustrating a process 400 of processing a probe packet at each of the distributed packet processors 210-230 in the packet switched system 200 in FIG. 2. Processing at the packet processor 210 is used as an example. The process starts at S401 and proceeds to S410.

At S410, a probe packet is received at the forwarding engine 214 either from one of the links 271 or the switch fabric 250, and it is recognized as a probe packet and forwarded by the forwarding engine 214 to the probe packet processor 216.

At S420, the probe packet processor 216 determines from which counter to get a counter value based on information carried in the header of the probe packet, and then the counter value is stored by using one of the three storing techniques as described previously.

At S430, the probe packet is passed to the forwarding engine and then forwarded to the next distributed packet processor 220 based on the forwarding path information carried by the probe packet. Alternatively, after the probe packet passes through the last selected distributed packet processor 230, it is forwarded either to the local management controller 240 via the switch fabric 250 or to the remote management controller in the remote system coupled with the LAG 270. Next, the process proceeds to S499 and terminates.

Figure 5:
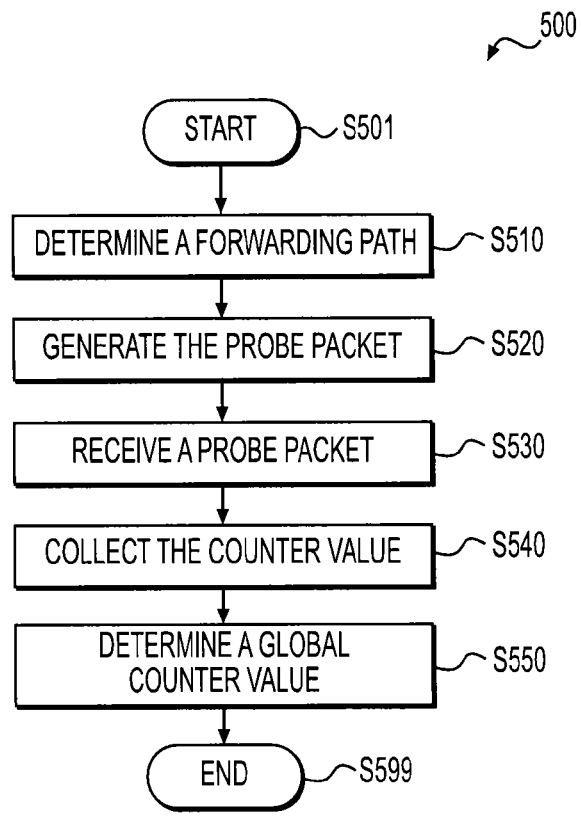
FIG. 5 shows a flowchart illustrating a process 500 of generating and processing a probe packet at the management controller 240 in the packet-switched system 200 shown in FIG. 2.

FIG. 5 shows a flowchart illustrating a process 500 of generating and processing a probe packet at the management controller 240 in the packet-switched system 200 shown in FIG. 2. The process starts at S501 and proceeds to S510.

At S510, the management controller 240 selects a subset of distributed packet processors in the packet-switched system 200 to be probed and determines an order of passing through the selected packet processors and subsequently determines a forwarding path for the probe packet 261. At the same time, the type of counters, such as Tx counters, in the selected distributed packet processors is also determined.

At S520, the probe packet 261 is generated carrying the information of the forwarding path and the type of counters.

At S530, the probe packet 262 forwarded from the last selected distributed packet processor included in the forwarding path determined by the remote system coupled with the LAG 270 is received at the management controller 240.

At S540, the management controller 240 collects the distributed counter values either by directly reading the incorporated counter values from the corresponding fields of the received probe packet, or by sending requests to the distributed devices to retrieve the counter values stored in the local memories in the distributed packet processors.

At S550, a global counter value can be obtained based on the counter values collected at S540. Subsequently, based on the global counter value, the management controller calculates a packet loss rate for the LAG 270. Next, the process proceeds to S599 and terminates.

According to an aspect of the disclosure, the method of collecting distributed counter values by utilizing a probe packet passing through the selected distributed devices can be used in a switch network in a datacenter in a context of cloud computing, where numerous servers and switches are connected via a switch network. In this scenario, a controller, for example, a separate computer acting a management role of the switch network, collects traffic metering counter values from servers or switches by using a probe packet in a similar way described above. In this example, traffic metering counters counting bytes in each server or switch are used to monitor the network traffics and to gather statistics in order to control the traffics or to charge customers who are users of the different servers.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method comprising:
   transmitting a probe packet through a first set of distributed packet processors in a first packet-switched system and a second set of distributed packet processors in a second packet-switched system that communicate with the first set of distributed packet processors via multiple links that are part of a link aggregation group (LAG);
   storing, by at least one of the distributed packet processors of the first set and second set of distributed packet processors, counter values in the probe packet corresponding to a packet flow over the multiple links for subsequent delivery to a first management controller; and
   calculating, at the first management controller, a performance parameter related to the LAG based on a first global counter value for the first set of distributed packet processors and a second global counter value for the second set of distributed packet processors, the first and second global counter values being determined based on the counter values stored in the probe packet.

2. The method according to claim 1, further comprising:
   determining a forwarding path including the first set and second set of distributed packet processors at a second management controller for transmitting the probe packet; and
   generating the probe packet at the second management controller.

3. The method according to claim 2, further comprising including a first field in the probe packet that identifies the packet as a probe packet and a second field in the probe packet for storing the counter values of the packet processors.

4. The method according to claim 1, wherein storing the counter values comprises:
   saving the counter values into separate fields of the probe packet.

5. The method according to claim 1, wherein storing the counter values comprises:
   aggregating the counter values into a field of the probe packet.

6. The method according to claim 1, further comprising:
   writing one of the counter values to a memory within at least one of the distributed packet processors of the first and second set of distributed packet processors as a response to receiving the probe packet; and
   transmitting the counter value of the memory to the first management controller in response to a request from the first management controller.

7. The method according to claim 1, further comprising counting a number of packets of the packet flow received at ones of the second set of distributed packet processors or transmitted at ones of the first set of distributed packet processors to obtain the counter values.

8. The method according to claim 1, further comprising counting a number of bytes of the packet flow received at ones of the second set of distributed packet processors or transmitted at ones of the first set of distributed packet processors to obtain the counter values.

9. A chassis switch, comprising:
   multiple distributed packet processing circuits associated with a link aggregation group (LAG), at least a first packet processing circuit among the multiple distributed packet processing circuits including a first counter configured to maintain a first counter value corresponding to packets of a first packet flow that are received over the LAG, the first packet processing circuit being further configured to store the first counter value in a first probe packet received from another switch associated with the LAG;
   a management controller circuit configured to,
      receive the first probe packet and collect first counter values of the multiple distributed packet processing circuits to determine a global counter value for the packets of the first packet flow received over the LAG, and
      calculate a performance parameter related to the LAG based on the global counter value and counter values carried in the first probe packet corresponding to packets of the first packet flow transmitted from the other switch over the LAG.

10. The chassis switch according to claim 9,
   wherein at least a second packet processing circuit associated with the LAG includes a second counter that maintains a second counter value corresponding to packets of a second packet flow transmitted over the LAG, and
   the management controller circuit is further configured to transmit a second probe packet through the multiple distributed packet processing circuits, wherein at least one of the multiple distributed packet circuits stores a second counter value in the second probe packet.

11. The chassis switch according to claim 10, wherein the management controller circuit is further configured to determine a forwarding path including ones of the multiple distributed packet circuits for transmitting the second probe packet and generate the second probe packet.

12. The chassis switch according to claim 10, wherein ones of the multiple distributed packet processing circuits store second counter values by saving a second counter value into a separate field of the first probe packet.

13. The chassis switch according to claim 10, wherein ones of the multiple distributed packet processing circuits store second counter values by aggregating the second counter values into a field of the second probe packet.

14. The chassis switch according to claim 10, wherein ones of the multiple distributed packet circuits are configured to store second counter values by writing a first second counter value to a memory within respective distributed packet processing circuits as a response to receiving the second probe packet and transmit the stored value to the management controller circuit in response to a request from the management controller circuit.

15. The chassis switch according to claim 10, wherein the second probe packet includes a first field that identifies the second probe packet as a probe packet and a second field for storing second counter values of the distributed packet processing circuits.

16. The chassis switch according to claim 10, wherein ones of the multiple distributed packet processing circuits are respectively configured to count a number of packets of the second packet flow transmitted over the LAG to maintain a second counter value.

17. The chassis switch according to claim 10, wherein ones of the multiple distributed packet processing circuits are respectively configured to count a number of bytes of packets of the second packet flow transmitted over the LAG to maintain a second counter value.

* * * * *